Jan. 28, 1964  H. N. GRILLOT ETAL  3,119,323
WIRE TWISTER FOR BALERS
Filed March 5, 1962  5 Sheets-Sheet 1
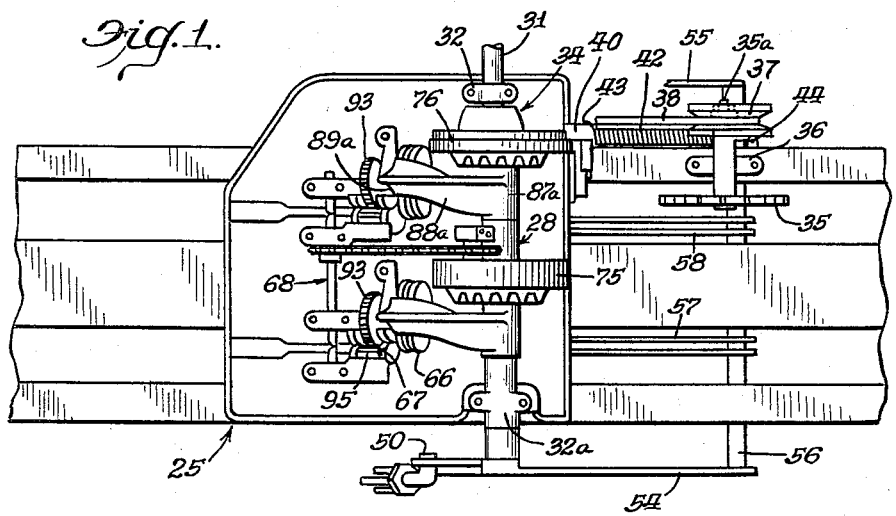
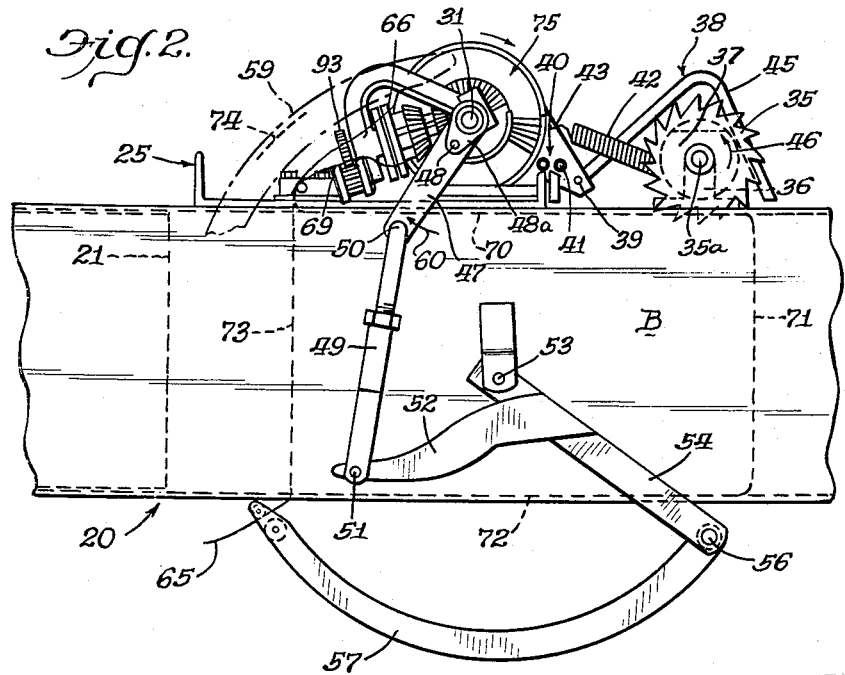
INVENTORS
Homer N. Grillot
John R. Timberlake

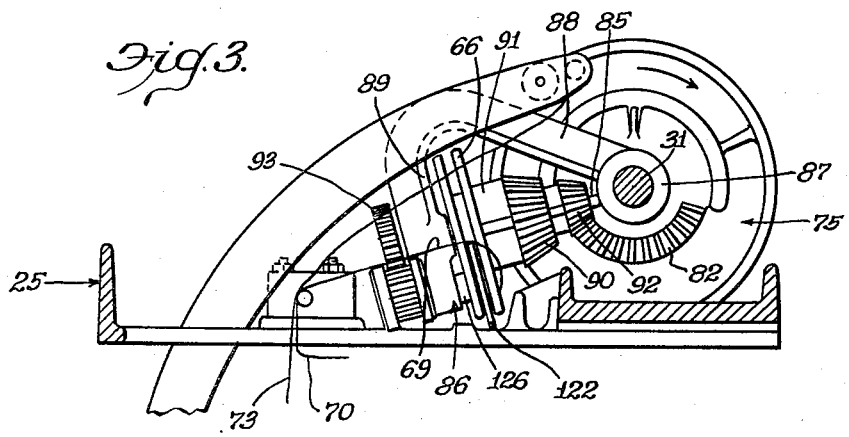
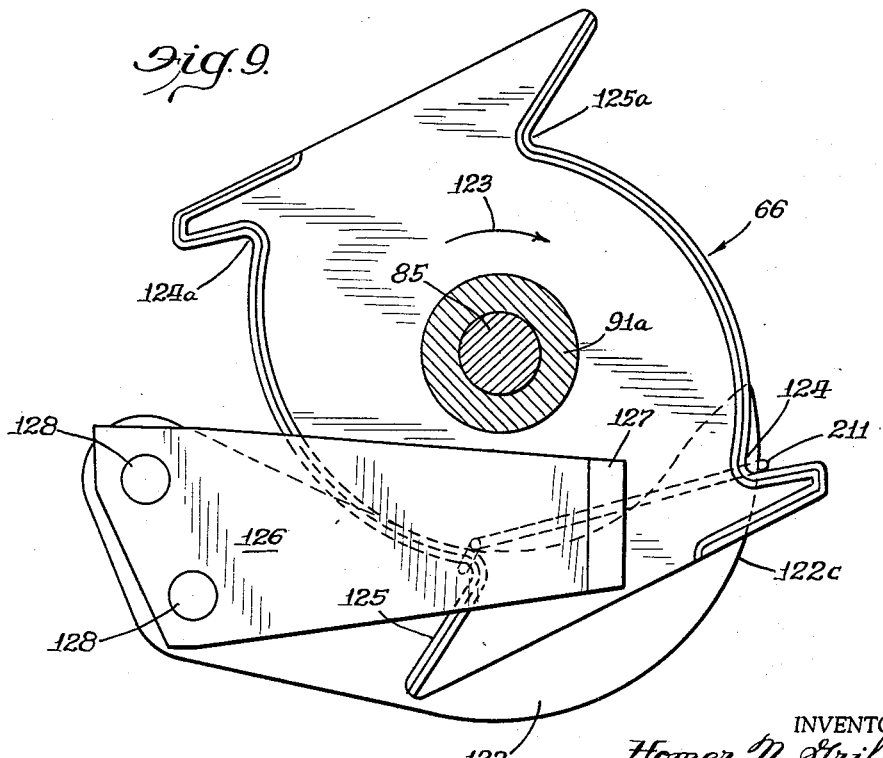

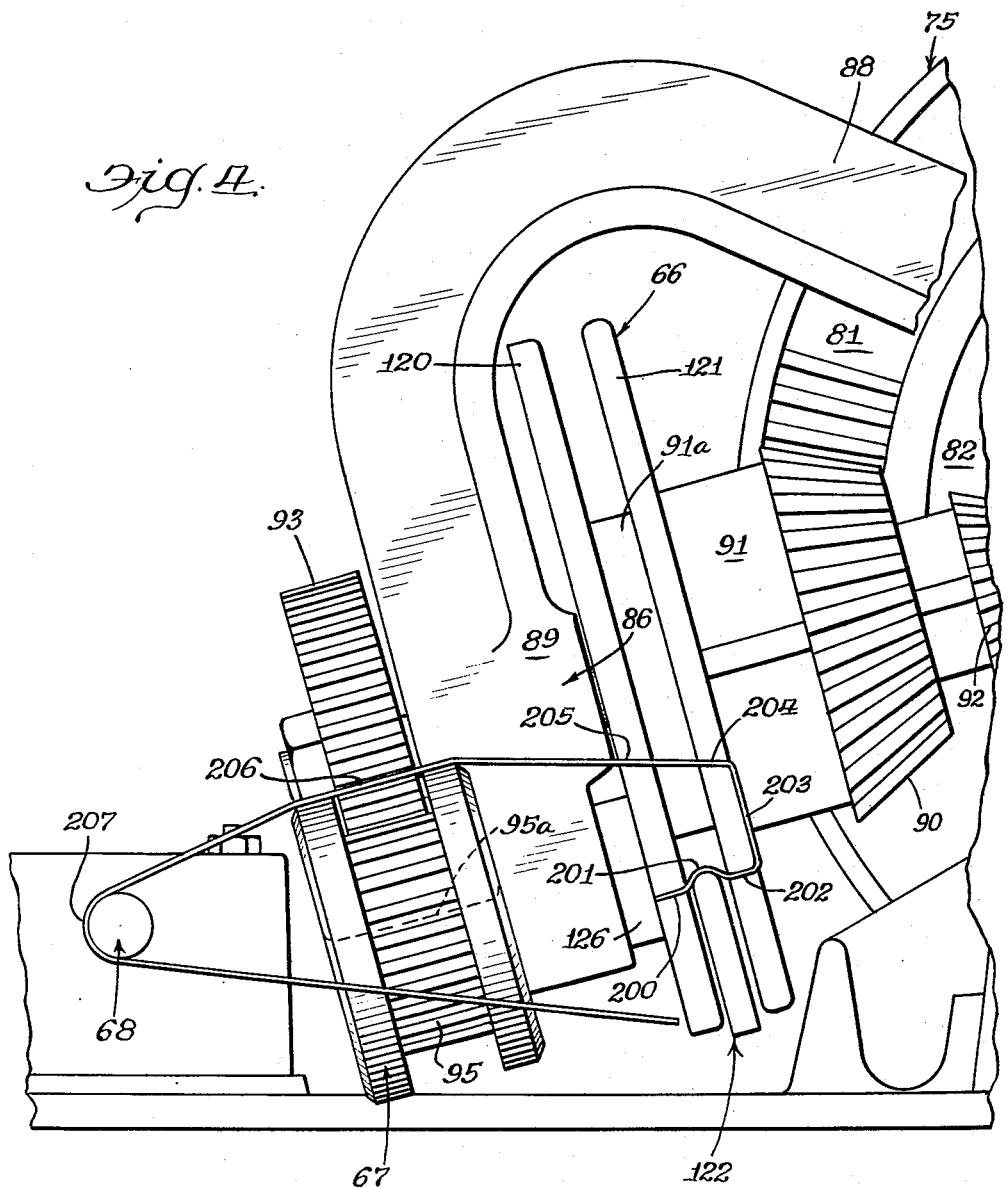

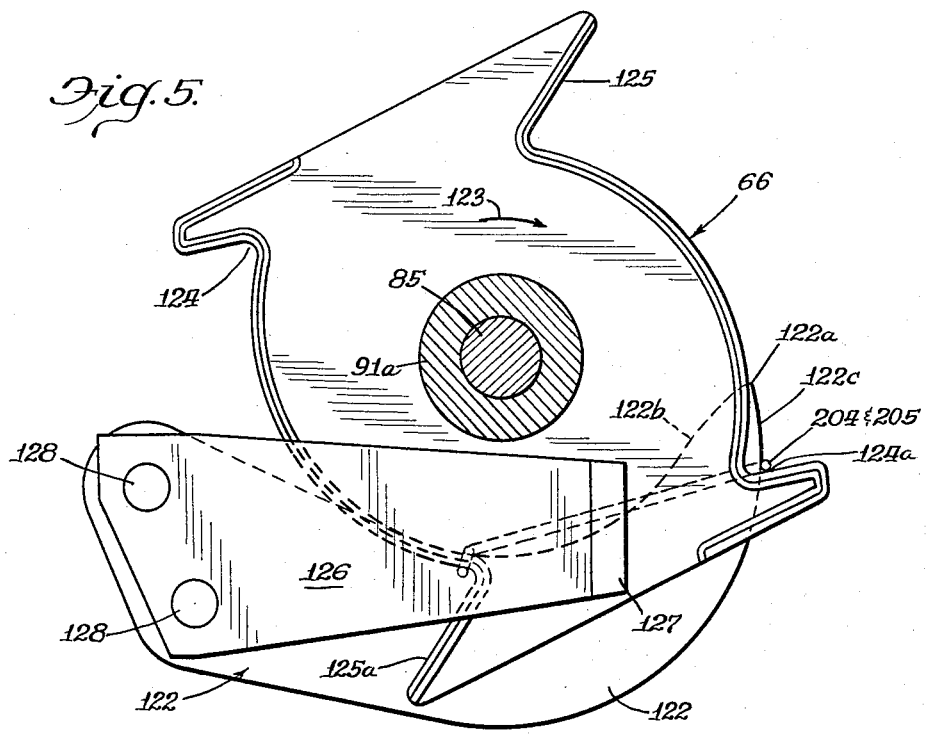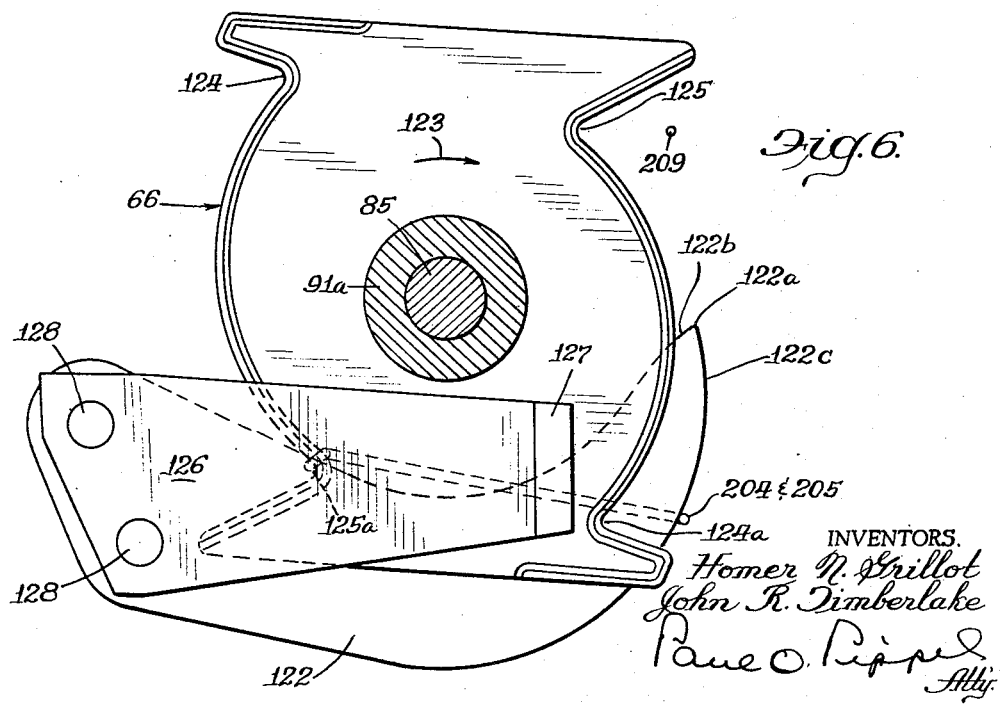

Jan. 28, 1964    H. N. GRILLOT ETAL    3,119,323
WIRE TWISTER FOR BALERS
Filed March 5, 1962    5 Sheets-Sheet 5

INVENTORS.
Homer N. Grillot
John R. Timberlake

United States Patent Office 3,119,323
Patented Jan. 28, 1964

3,119,323
WIRE TWISTER FOR BALERS
Homer N. Grillot, Naperville, and John R. Timberlake, Downers Grove, Ill., assignors to International Harvester Company, Chicago, Ill., a corporation of New Jersey
Filed Mar. 5, 1962, Ser. No. 177,523
16 Claims. (Cl. 100—4)

This invention relates to a new and improved wire twister for balers.

The present invention is directed to an improvement in the wire twister for balers as shown in the Patrick L. May Patent 2,897,747 and in the wire twister for balers disclosed in the companion, copending application entitled Wire Holder and Releaser for Wire Twister for Balers, Serial Number 156,842, filed on December 4, 1961, and assigned to the present assignee.

Whenever wire is used to tie bales of hay, a burden is imposed on the feeder of livestock to prevent the animals from eating any pieces of wire. In breaking the bales open for the purpose of feeding the hay to animals the farmer must always be careful to see that he picks up all of the wire comprising the strand and twist therein. This phase of the operation the farmer can control. However, it is the pieces of wire that drop in the field as the bales are being formed and tied with wire and over which the farmer has no control that pose his most serious problem. His only control lies in purchasing or using a baler which does not drop short pieces of wire during the tying and twisting operation. Livestock eating short pieces of wire along with hay or grain often suffer serious damage to their digestive tracts. It is not at all uncommon for animals to have their stomachs ruptured with short, sharp pieces of bale encircling wire.

It is a principal object of the present invention to provide a wire twister which insures that no short pieces of wire strand are cut in the making of a wire twist.

An important object of this invention is the provision of means in a wire holder for a wire twister to guide only certain of plural strands into engagement with a shearing knife.

Another important object of this invention is to supply a wire holding mechanism including a rotatable plate member having variable depth notch means arranged and constructed with a shearing knife positioned adjacent the deepest notch and further positioned to avoid engagement with the shallowest notch.

Another important object of this invention is to equip a wire holding and cutting mechanism for wire twisters for balers in which there is included a rotatable disc having variable depth notches open to the periphery thereof, a keeper blade having an outwardly tapering end terminating at a position intermediate the depth of the peripheral notches whereupon strands of wire carried by the deep notch will be guided to one side of the keeper blade and wire strands carried by the shallowest notch will be guided to the other side of the keeper blade.

Still another important object of this invention is to provide a wire holding, guiding and cutting mechanism for a wire twister for balers in which there is included a rotatable disc having at least one radially extending deep notch therein open to the periphery and at least one relatively shallow radial notch open to the periphery in combination with a keeper blade and a wire shear knife arranged to positively cut the wire strand in the deep notch and avoid cutting the strand in the shallow notch.

Another and still further important object of this invention is the provision of an arrangement of wire holding and moving elements in association with a wire cutting knife whereby a wire strand to be cut is positively guided and directed into the cutting knife while the strand to be retained is positively guided and directed away from the cutting knife.

A still further important object of this invention is to provide spaced apart axially aligned rotating wire holding discs, the outer peripheries of which are provided with similar open surfaced notches extending radially inwardly toward the axis of rotation of the spaced apart discs, certain of said discs being substantially deeper than the other of said discs, a wire keeper blade disposed between the spaced apart discs and substantially filling the space therebetween, the outer end of the keeper blade being tapered and disposed at a radial extent from the axis of rotation of the discs at substantially the mid-point between the deep notches and the shallow notches, a wire cutter, and the shape of the inner side of the keeper blade arranged and constructed to guide a wire strand in a deep notch in the rotating discs into cutting engagement with the knife and the shape of the outer side of the keeper blade arranged to guide a wire strand in the shallow notch outwardly of the wire cutter.

Other and further important objects and advantages will become apparent from the disclosures in the following specification and accompanying drawings.

In the drawings:

FIGURE 1 is a top plan view of a portion of a hay baler incorporating the wire holder and releasing mechanism of this invention.

FIGURE 2 is a side elevational view of a portion of the baler as shown in FIGURE 1.

FIGURE 3 is an enlarged view partially in section of a portion of the wire twisting mechanism of the device as shown in FIGURE 2.

FIGURE 4 is a further enlarged detailed view of a portion of the side of the device as shown in FIGURE 3.

FIGURE 5 is a front elevational view of the wire holding mechanism and knife cutter of the device as shown in FIGURE 4.

FIGURE 6 is a view similar to FIGURE 5 with the wire holding discs rotated 30° from the position as shown in FIGURE 5.

FIGURE 9 is a view similar to FIGURES 5, 6 and 8 with the wire holding discs rotated 180° from that shown in FIGURE 4.

As shown in the drawings:

Figure 7:
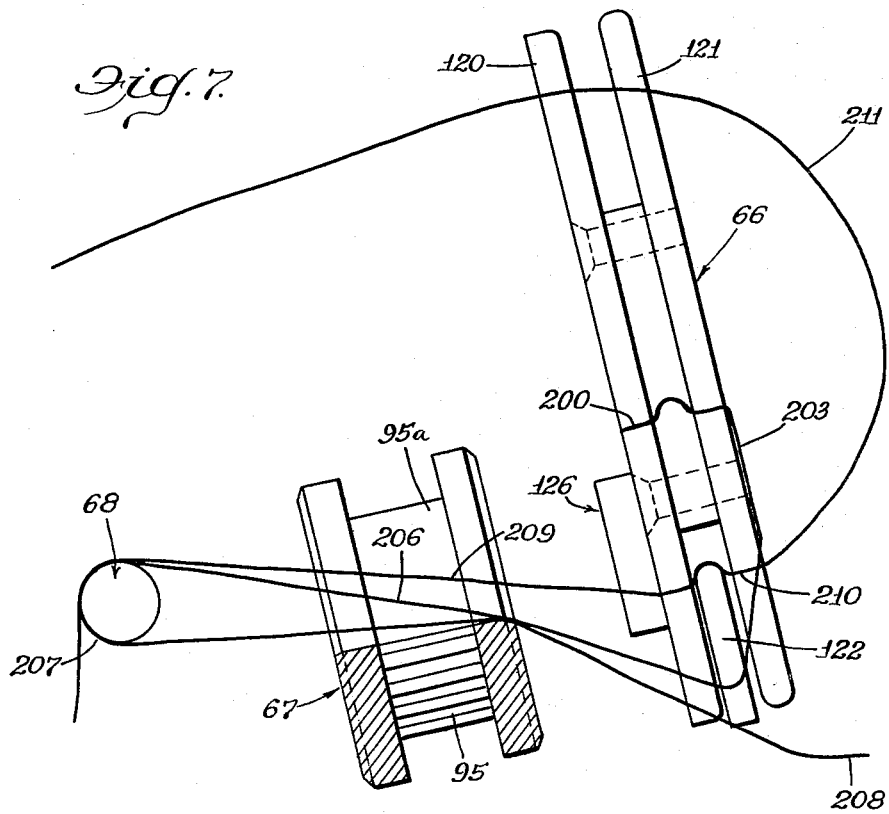
FIGURE 7 is a somewhat diagrammatic view similar to FIGURE 4 with the wire holding disc rotated 120° from that shown in FIGURES 4 and 5.

The reference numeral 20 indicates generally a bale forming chamber on which the wire twister of this invention is mounted and including the novel wire holding, guiding and cutting means. A reciprocating plunger 21 moves longitudinally within the bale forming chamber 20 and acts to compress hay therewithin to form bales. The baler of this invention is of the type shown in the Crumb et al. Patent 2,450,082. A reinforcing breast plate 25 is fixedly mounted on top of the bale forming chamber 20 and acts as a frame support for the wire twister of this invention. A constantly driven clutch housing 28 is mounted on the top of the bale forming chamber 20 and imparts rotational drive to the wire twisting mechanism of this invention.

The driven clutch housing 28 is provided with a centrally disposed shaft 31 journally carried within spaced apart bearings 32 and 32a. The clutch housing 28 forms a part of a single revolution clutch 34 which acts to impart drive to the wire twisting mechanisms as will hereafter be described. The clutch 34 is similar in operation and structure to a corresponding clutch shown in the patent to Bornzin 2,634,840. The clutch housing 28 of the clutch 34 rotates constantly as long as the hay baler is operating. It is the function of the clutch 34 and an operating means therefor to intermittently cause a driving of the internal shaft 31 on which is mounted the wire twisting mechanisms.

A bale length metering wheel 35 as shown in FIGURES 1 and 2 has hay penetrating teeth of the sawtooth type around its periphery which are adapted to engage the top surface of the hay being formed into bales within the bale forming chamber 20. The movement of the baled hay imparts rotational movement to the metering wheel 35. The metering wheel determines the length of the bale by actuating the wire twisters upon the completion of its formation. The metering wheel 35 has a central shaft 35a which is carried in a bearing support 36 on the bale chamber 20. A pulley or sheave 37 is mounted on the end of the shaft 35a opposite the metering wheel 35. Thus as the metering wheel 35 rotates by engagement with the hay moving therethrough, rotational movement is imparted to the pulley 37. An actuating arm 38 arranged and constructed to engage the sheave 37 is carried at 39 on a clutch trip arm 40. The clutch trip arm 40 is pivoted at 41 on the supporting structure 25. A spring 42 is fastened at one end at 43 to the trip arm 40 and at its other end at 44 to the stationary bale chamber 20. The spring 42 thus normally urges the trip arm 40 toward a clockwise rotation. The details of the clutch have not been further amplified in this application for patent because of the prior disclosures in the patent to Bornzin 2,634,840 and the patent to May 2,897,747.

As shown in FIGURE 2 the actuating arm 38 has a downwardly bent portion 45 which is adapted to engage the V-notch of the sheave 37. By reason of the spring 42 the bent end portion 45 is pulled into the annular notch of the V-pulley 37. Rotation of the metering wheel 35 in the direction of the arrow 46 causes a similar rotation of the sheave 37 and an upward movement of the bent end 45 of the actuating arm 38. The clutch trip arm 40 may not operate until the lower edge of the bent end 45 of the actuating arm 38 rides over the top of the sheave 37 thus permitting the spring 42 to pull outwardly on the clutch trip arm 40 to thereupon effect actuation of the wire twisting mechanism.

A crank arm 47 is fastened to the shaft 31 by means of a pin 48 and shaft collar 48a. An adjustable length connecting link 49 is pivotally attached at 50 to the outer end of the crank arm 47. The other end of the adjustable length connecting link 49 is pivotally attached at 51 to a second crank arm 52 which is shown in FIGURE 2. Generally parallel arms 54 and 55 are attached to each side of the bale forming chamber 20 by axially aligned stub shafts constituting a hinge 53. The outer ends of the arms 54 and 55 carry a transverse rod 56. Drive is imparted to the arms 54 and 55 by the attachment of the second crank arm 52 to the arm 54 at 52a. The rod 56 supports, intermediate its ends, spaced apart wire carrying needles 57 and 58. The strand carrying needles 57 and 58 are adapted to move upwardly through the bale forming chamber 20 to the dash line position as shown at 59 in FIGURE 2 whenever the trip mechanism causes the shaft 31 to rotate. The crank arm 47 makes a full revolution in the direction of the arrow 60 thus causing the link 49 to move the crank arm 52 and the wire carrying needles 57 and 58 upwardly through the bale forming chamber 20. The needles lay the wire strands over the wire twisting mechanism as descried in the copending application entitled Wire Holder and Releaser for Wire Twister for Balers, Serial Number 156,842, filed on December 4, 1961.

A source of wire supply provides a wire strand 65 as shown in FIGURE 2 which is picked up by the needle 57 and carried upwardly in a looped manner with the needle to the wire twisting mechanism. A wire strand from a previous twist is held in the holder 66 and passes forwardly over twister elements 67 and over end abutting aligned shaft means 68 which constitute the wire holding and releasing means of the invention shown in companion case, Serial Number 156,842, filed on December 4, 1961. New wire strands carried upwardly by the needles 57 and 58 are laid across these same elements and join with the strand from the previous twist preliminary to making an inline twist.

The wire strand 65 coming from the source of supply is gripped at its end by the wire holder 66 whereupon it extends forwardly over the wire holder and releasing mechanism which as shown in the device illustrated in FIGURES 1, 2 and 3 consists of end abutting aligned shafts 68. This portion of the strand shall for convenience be designated by the numeral 69. From here the strand extends rearwardly over the top of the bale B as shown at 70. A generally vertical portion 71 of the wire strand comes down over the rear end of the bale B, and a portion 72 projects forwardly in a generally horizontal direction along the bottom of the bale B. The wire carrying needles 57 and 58 carry looped portions of wire strands upwardly over the front end of the formed bale and the portions of the strand adjacent the bale of hay are designated by the numeral 73. The side 74 of the looped strand carried by the needles away from the bale B is disposed on the front or top side of the needles. It is this portion 74 of the bale encircling strand that becomes the rear strand portion of a succeeding bale as it is formed in the bale forming chamber. The looped portions of strand carried by the needles are divided so that the one side thereof completes the bale encircling strand of one bale and the other side thereof provides the beginning of the bale encircling strand for the next formed bale in the hay baler.

As best shown in FIGURE 3 a shaft 85 is disposed at right angles to the shaft 31 and is carried in a support 86. The support 86 includes a sleeve-like bearing 87 which is journally mounted over the shaft 31. The bearing support 86 further includes an angularly disposed arm member 88 and a downwardly projecting bent end portion 89 to journally receive the shaft 85. The bearing support 86 thus constitutes a supporting structure on which the wire holding, guiding and shearing mechanism of this invention is carried. A bevel gear 90 is journally supported on the shaft 85 and is in meshing engagement with an outer mutilated bevel gear 81 on the ring member 75. The shaft 31 carries spaced apart, enlarged ring members 75 and 76 as shown in FIGURE 1. The details of this construction are shown in the copending, companion case, Serial Number 156,842, filed on December 4, 1961. The bevel gear 90 is provided with a hub 91 which carries for rotation therewith the wire holding disc 66 forming a principal part of the present invention. A second bevel gear 92 is in engagement with an innermost mutilated bevel gear 82 of the ring member 75. The bevel gear 92 is affixed to the shaft 85 so that it imparts rotation thereto when the bevel gear 92 is in meshing engagement with teeth in the bevel gear 82 of the ring member 75. The other end of the shaft 85 has mounted thereon a spur gear 93 which is keyed or otherwise fastened to the shaft 85. As shown in the companion copending application, Serial Number 156,842 filed on December 4, 1961, it is this spur gear 93 that drives a split pinion 95 of the twister 67 to effect an intertwisting of the ends of wire strands.

The wire holder 66 is illustrated more explicitly in FIGURES 4 to 9 inclusive. The holder includes spaced apart discs or plate members 120 and 121 and an included spacer element 91a. The spacer 91a is an extension of the hub 91 and passes centrally through the spaced discs 120 and 121. The discs and their included spacer form a unitary assembly. Thus as the bevel gear 90 is rotated so also is the wire holding means 66. Wire strands are held between the discs by means of a keeper blade or wire holding member 122. The discs moving as a unit and driven by the bevel gear 90 rotate in the direction of an arrow 123 as shown in FIGURES 5 and 9.

The discs 120 and 121 are provided with a plurality of similar peripherally opening notches into which wire strands are laid during the baling and wire twisting operation. The notches are of different radial depth. Wire strands are carried upwardly by the needles 57 and 58 and are deposited adjacent certain notches in the discs 120 and 121. FIGURES 5, 6, 8 and 9 show successive positions of rotation of the discs for holding the wire strands, for placement of the wire strands in the twisting mechanism 67 and for subsequent shearing of certain of the wire strands upon completion of the bale and the intertwisting of the bale encircling wire strand ends.

FIGURE 5 shows the location of the disc 120 and 121 in their home position. It is in this position that the discs remain while the bale is being formed in the bale forming chamber 20.

FIGURE 6 shows the relative position of the discs with their cooperative elements after rotating 30° from home position.

Figure 8:
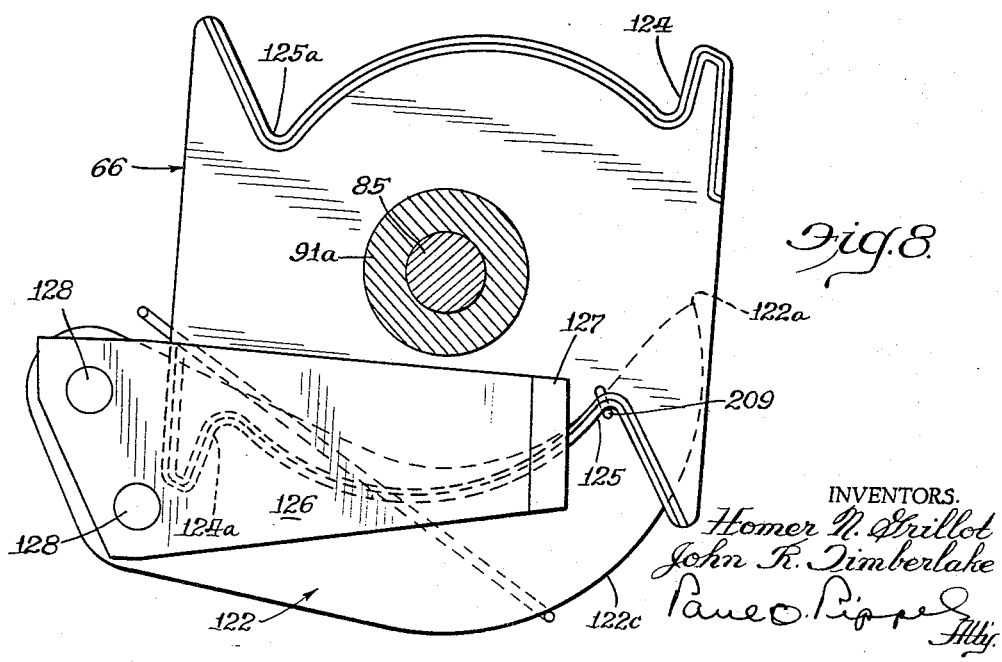
FIGURE 8 is a view similar to FIGURES 5 and 6 with the discs rotated to the position as shown in FIGURE 7.

FIGURE 8 shows the position of the discs after they have rotated 120° from the home position of FIGURE 5.

FIGURE 9 shows the position of the discs after they have rotated 180° from the home position of FIGURE 5.

For convenience the several peripheral notches and the cooperative elements aiding in holding and subsequently guiding and cutting of the wire strands will be identified in the wire twisting position as shown in the discs FIGURE 8. The notch 124 in the upper right hand corner of the discs is adapted to receive the end or substantially the end of a wire strand portion such as 73 which comes up on the lower or bale side of the wire carrying needles 57 and 58 as shown in FIGURES 2 and 3. The notch 124, and a diametrically opposed identical notch 124a, are of relatively shallow radial depth. Intermediate notches in the periphery of the discs 120 and 121 are shown at 125 and 125a which are also diametrically opposed but in this instance are of substantially greater radial depth than the alternate diametrically opposed slots 124 and 124a. In the device of FIGURES 2 and 3 the needle wire 73 is forced behind the keeper blade 122. As the disc rotates the needle wires pull away from the needle, putting the wire in tension and thereby forcing the wire into the bottom of a deep notch such as shown at 125. Due to the relation between the deep notch 125 and the keeper blade 122 the wire is forced behind the keeper blade. The keeper blade is designed to release the tail wire just as the wire twisting split pinion 95 completes its first rotation. This permits the tail wire to render as the twist is being formed.

A wire knife 126 is shown in FIGURES 4 to 9 inclusive and is so positioned that a generally vertically disposed cutting edge 127 having an extent projecting substantially radially from a position outside the central shaft 85 and continuing outwardly to a position beyond the depth of the deep peripherally opening notches 125 and 125a, but short of the shallow notches 124 and 124a. The discs 120 and 121 have identical peripheral configurations. They are equipped with identical notches and in exactly aligned relationship with respect to each other. In combination with the wire guiding keeper blade 122 the disc notches make it impossible to cut short separate wire tailpieces. This is true because the keeper blade 122 has a particular relationship with the shallow notches 124 and 124a which support the tail wire. The keeper blade 122 definitely guides the tail wires held by the shallow notches outside the cutting area of the wire shear knife 126. As shown in FIGURES 5, 6, 8 and 9, the knife 126 is fastened by means of bolts or the like 128 to the stationary bearing support 86. FIGURES 4 and 7 show a square edge on the side of the plate 120 adjacent the knife 126 to insure a sharp shearing of a strand as it is moved by the plate 120 past the knife 126.

The wire twister for balers shown and described herein is the same in principle as the prior patent to P. L. May 2,897,747 and differs only in certain improvements in the wire holding mechanisms, the guiding of wire strands and the cutting of the wire strands. The wire twister of the present invention makes a twist identical to that made by the previous May device.

In the general operation of the device of this invention the metering wheel 35 measures the bale length as the bale of hay is formed by reason of reciprocation of a plunger 21 causing hay to be compacted in the bale forming chamber 20. At some desired predetermined length of bale, the metering wheel 35 trips the single revolution clutch 34 which actuates the twister shaft 31. The single revolution clutch is similar to the clutch used in the prior May patent. The wire is placed over the split pinion 95 as shown in FIGURE 4. As the twister shaft 31 rotates the relatively large diameter ring members 75 and 76 which are keyed to the shaft 31 also rotate. At approximately 60° of rotation of the ring members 75 and 76 which may also be termed twister delay gears the bevel gear 92 also termed a twister delay pinion is rotated 90° by contacting a single tooth on the large bevel gear 82 of the ring member 75. The twister delay pinion 92 is pinned to the shaft 85 to which the twister drive gear 93 is keyed. The twister drive gear 93 is in meshing engagement with the split pinion 95. It is preferable that the gear 93 drive the split pinion 95 at a 1 to 2 ratio. The positioning of the slot in the split pinion is shown in the companion copending application, Serial Number 156,842 filed on December 4, 1961, and similarly all of the twisting operation is shown in detail in this companion case.

The sequence of operation of the movements of the wire holding discs in relation to the keeper blade and the wire shear knife is graphically shown in FIGURES 4 to 9 inclusive. The home position of the wire holding mechanism 66 is shown in both of FIGURES 4 and 5. The shape and contour of the keeper blade or wire holding members 122 are very important to the successful operation of the device of this invention. As shown in FIGURE 5 the outer end of the keeper blade 122 which passes between the spaced discs or plates 120 and 121 is tapered to a point 122a having an inner curved surface 122b and an outer or under curved surface 122c. The radial disposition of the tapered point 122a from the axis of rotation of the shaft 85 is between the depth of the deep notches 125 and 125a and the depth of the shallow notches 124 and 124a. Thus when a wire strand is in one of the deep notches and the disc passes the keeper blade 122 the wire is guided inwardly over the inner curve surface 122b. When the wire strand is guided over the inner curved surface 122b of the keeper blade 122 the strand is positively guided into the cutting edge 127 of the shear knife 126. Conversely when a wire strand is in one of the shallow notches 124 or 124a the pointed end 122a of the keeper blade insures that the strand will be picked out of the shallow notch and guided outwardly over the outer curved surface 122c which guides the strand outwardly of the discs 120 and 121 and away from the scope of cutting of the shear knife 126.

The wire holder 66 comprising the discs 120 and 121 in the sequence shown in FIGURES 5, 6, 8 and 9 is required to start and stop three times. For convenience new reference numerals will be placed on the wire strands and the portions thereof shown in the sequence of wire holding and wire guiding operations in FIGURES 4 to 9 inclusive. As shown in FIGURE 4 the strand end 200 is shown in notch 125a of the disc 120. From here the adjacent portion 201 of the strand passes over the top surface 122b of the keeper blade 122 and thence the next adjacent portion 202 passes outwardly through the similar notch 125a of the disc 121. The next portion 203 of the strand extends upwardly over the outer surface of the disc 121. A portion 204 then extends through the shallow notch 124a of the disc 121 and an immediately adjacent portion 205 extends through the disc 120. From this point a portion 206 moves forwardly over the split pinion 95 and around the split wire holding shaft 68 as shown at 207. An extended portion 208 is guided downwardly into the bale forming chamber and forms the top run over the formed bale similar to that shown at 70 in FIGURE 2.

Now moving to the relative position of elements as shown in FIGURE 6 the portions 204 and 205 of the wire strand which pass through the shallow notches 124a of the spaced discs 120 and 121 are now being positively guided outwardly of the discs by the curved surface 122c of the keeper blade 122. This insures that these strand ends will not be in the path of shear of the knife 126 and its cutting edge 127. Now at this time a new wire 209 is laid alongside the deep notches 125 of the disc 120 and 121 by the transversely spaced apart wire carrying needles 57 and 58. As the discs start to rotate they pick up the new wire 209 from the needles and position it in the deep notches 125. The keeper blade 122 will take the wire from the deep notches 125 and guide it over the inner curved surface 122b and into the cutting edge 127 of the knife 126. This last action is clearly shown in FIGURES 7 and 8 as continued rotation of the discs causes the new wire 209 to be positively guided along the internal curved surface 122b of the arcuate keeper blade. The wire strand is now in a position approaching the cutting edge 127 of the knife 126. As the discs 120 and 121 rotate the strand 209 is also pulled into the twisting slot 95a of the split pinion 95, along with the previously inserted strands 206 and 208 so that upon rotation of the slotted pinion 95 the three strands 206, 208 and 209 are intertwisted. An extension 210 of the newly laid wire 209 is held between the discs 120 and 121 and the keeper blade 122. As the twist is being completed the new strand is severed by reason of its being pulled inwardly against the cutting edge 127 of the shear knife 126 as it is held against the square edge of the plate 120 thereupon releasing the completed and bound bale inasmuch as the strand end 200 has moved out of the path of holding by the keeper blade 122. As the needles 57 and 58 are withdrawn a strand portion 211, an extension of the portion 210, and comparable to the strand portion 74 as shown in FIGURE 2 is drawn through the shallow notches 124 of the holder 66. FIGURE 9 shows the discs rotated their full 180°. The holder 66 is now in another home position wherein the cycle is ready to be repeated. The new wire has just been sheared and the held or retained end 211 is laid in the shallow notch 124 for eventual guiding away from the cutting edge 127 of the knife 126 by reason of the outer curved surface 122c of the keeper blade 122. It is in this position that the bale is formed and when the actuator mechanism trips the single revolution clutch as previously explained the twisting cycle recommences and the holding discs having the included keeper blade 122 and the wire shear knife 126 commences its starting and stopping operation for a total movement of 180°.

In the operation of the holding, guiding and cutting mechanism of the present invention it is the employment of dual depth open peripheral notches in cooperation with a keeper blade having a tapered outer end adapted to terminate at a radial disposition intermediate the depth of the shallow and deep notches to either guide the wire ends inwardly for cutting by the shear knife or outwardly to avoid cutting or even any engagement with the shear knife 126. The present construction avoids any possibility of wire ends being improperly sheared and either dropping to the field or getting packed in with the hay which is fed to livestock. The dual mechanism of rotating notched discs with the special keeper blade thus performs the desirable function of insuring proper severance of the wire strand and prevents improper cutting of loose wire tails by the outward guiding from the shallow notches by the outwardly curved surface 122c of the keeper blade 122.

We are aware that numerous details of construction may be varied throughout a wide range without departing from the principles disclosed herein and we therefore do not propose limiting the patent granted hereon otherwise than as necessitated by the appended claims.

What is claimed is:
1. A wire twister comprising:
   a. a supporting structure,
   b. a keeper blade mounted on said supporting structure,
   c. plate means journally mounted for rotation on said supporting structure adjacent said keeper blade,
   d. said plate means having radially disposed peripherally opening notches of varying depths,
   e. a knife mounted on said supporting structure and having a cutting edge disposed adjacent only the deepest of said notches,
   f. a twister element mounted on said supporting structure, and
   g. a wire holding and releasing mechanism mounted on said supporting structure.
2. A wire twister comprising:
   a. a supporting structure,
   b. a keeper blade mounted on said supporting structure,
   c. plate means journally mounted for rotation on said supporting structure adjacent said keeper blade,
   d. said plate means having radially disposed peripherally opening notches of varying depths,
   e. a knife mounted on said supporting structure and having a cutting edge disposed adjacent only the deepest of said notches,
   f. said keeper blade having a tapered outer end terminating at a radial distance from the axis of rotation of said plate means midway between the deepest and shallowest notches,
   g. a twister element mounted on said supporting structure, and
   h. a wire holding and releasing mechanism mounted on said supporting structure.
3. A wire twister comprising:
   a. a supporting structure,
   b. a keeper blade mounted on said supporting structure,
   c. plate means journally mounted for rotation on said supporting structure adjacent said keeper blade,
   d. said plate means having radially disposed peripherally opening notches of varying depths,
   e. a knife mounted on said supporting structure and having a cutting edge disposed adjacent only the deepest of said notches,
   f. said keeper blade having a tapered outer end terminating at a radial distance from the axis of rotation of said plate means midway between the deepest and shallowest notches,
   g. the inside of said keeper blade being arcuately curved to guide a strand of wire from the deepest notches directly into the cutting edge of said knife,
   h. a twister element mounted on said supporting structure, and
   i. a wire holding and releasing mechanism mounted on said supporting structure.
4. A wire twister comprising:
   a. a supporting structure,
   b. a keeper blade mounted on said supporting structure,
   c. plate means journally mounted for rotation on said supporting structure adjacent said keeper blade,
   d. said plate means having radially disposed peripherally opening notches of varying depths,
   e. a knife mounted on said supporting structure and having a cutting edge disposed adjacent only the deepest of said notches,
   f. said keeper blade having a tapered outer end terminating at a radial distance from the axis of rotation of said plate means midway between the deepest and shallowest notches,
   g. the outside of said keeper blade being curved to positively guide a strand of wire from the shallowest notches out of range of the cutting edge of said knife,
   h. a twister element mounted on said supporting structure, and i. a wire holding and releasing mechanism mounted on said supporting structure.

5. A wire twister comprising:
   a. a supporting structure,
   b. a keeper blade mounted on said supporting structure,
   c. plate means journally mounted for rotation on said supporting structure adjacent said keeper blade,
   d. said plate means having radially disposed peripherally opening notches of varying depths,
   e. a knife mounted on said supporting structure and having a cutting edge disposed adjacent only the deepest of said notches,
   f. said keeper blade having a tapered outer end terminating at a radial distance from the axis of rotation of said plate means midway between the deepest and shallowest notches,
   g. the inside of said keeper blade being arcuately curved to guide a strand of wire from the deepest notches directly into the cutting edge of said knife,
   h. the outside of said keeper blade being curved to positively guide a strand of wire from the shallowest notches of the cutting edge of said knife,
   i. a twister element mounted on said supporting structure, and
   j. a wire holding and releasing mechanism mounted on said supporting structure.

6. A wire twister comprising a supporting structure, a twister element mounted on said supporting structure, a holding and releasing member mounted on said supporting structure, a keeper blade carried on said supporting structure, a plate member rotatably mounted on said supporting structure adjacent said keeper blade, said plate member having plural notch means of different depths in its periphery, a knife mounted on said supporting structure adjacent to the axis of rotation of said plate member, and said knife extending generally radially outwardly a distance to cover only the deepest of said notch means.

7. A wire twister comprising a supporting structure, a twister element mounted on said supporting structure, a holding and releasing member mounted on said supporting structure, a keeper blade carried on said supporting structure, a plate member rotatably mounted on said supporting structure adjacent said keeper blade, said plate member having plural notch means of different depths in its periphery, a stationary knife mounted on said supporting structure adjacent to the axis of rotation of said plate member, and said knife extending generally radially outwardly a distance to cover only the deepest of said notch means.

8. A wire holding and cutting device for wire twisters including a supporting structure, a pair of parallel spaced apart plates journally mounted on said supporting structure, said plates having a plurality of notches of varying depths in the peripheries thereof, a stationary wire holding arm mounted on said supporting structure and projecting between said pair of plates, said arm arranged to hold a strand of wire in a deep notch and force wire out of a shallow notch, a knife carried on said supporting structure and having a cutting edge disposed from a position adjacent the axis of rotation of said plates and beyond the deepest notch, but short of the shallowest notch whereby rotation of the pair of parallel spaced apart plates causes only the wire strand in the deepest notch to be cut.

9. A wire twister comprising a supporting structure, a twister element mounted on said supporting structure, a holding and releasing member mounted on said supporting structure, a plate member rotatably mounted on said supporting structure, said plate member having spaced apart shallow and deep notches in its periphery, a stationary wire keeper blade carried on said supporting structure adjacent said plate member, said wire keeper blade having a tapered end terminating at a radial distance outwardly from the axis of rotation of said plate between the depths of the shallow and deep notches, a knife carried on said supporting structure, and whereby when a wire strand is carried in one of said notches it is guided by the tapered end of the wire keeper blade into the knife and conversely when a wire strand is carried in the other of said notches it is guided away from said knife.

10. A device as set forth in claim 9 in which said knife has a cutting edge of a radial extent encompassing only the deepest of said notches.

11. A device as set forth in claim 10 in which said wire keeper blade has its inner side formed to guide wire strands in the deepest of said notches into the cutting edge of said knife.

12. A device as set forth in claim 11 in which said wire keeper blade has its outer side formed to guide wire strands in the shallowest of said notches out of range of the knife's cutting edge.

13. A wire twister for balers having a bale forming chamber, a source of wire supply, needle means on one side of said bale forming chamber adapted to carry a strand of wire across the bale forming chamber, a twister element, a holding and releasing member, means gripping said strand of wire on the side of the bale forming chamber opposite the needle means, a wire shear knife mounted on said bale adjacent said means gripping the strand of wire, means for compressing material to be baled in said bale forming chamber against said strand crossing the chamber and causing the strand to be extended by pulling from the source of wire supply, means to actuate the needle means when a bale of desired length has been formed, said needle means carrying a looped strand across the bale forming chamber and laying the inner portion of said looped strand into a first portion of said means gripping the wire strand and laying the outer portion of said looped strand into a second portion of said means gripping the wire strand, means guiding the strand in the first portion of said means gripping the strand into said wire shear knife, and means guiding the strand in the second portion of said means gripping the strand away from said wire shear knife.

14. A device as set forth in claim 13 in which said means gripping the strand includes transversely disposed rotatable plate means, said first portion thereof comprising a relatively deep notch, and said second portion thereof comprising a spaced apart relatively shallow notch.

15. A device as set forth in claim 14 in which said means guiding the strand includes an arcuately shaped keeper blade.

16. A device as set forth in claim 15 in which said arcuately shaped keeper blade is provided with a tapered end disposed intermediate the depths of the shallow and deep notches adjacent the rotatable plate means.

References Cited in the file of this patent

UNITED STATES PATENTS

| | | |
|---|---|---|
| 2,469,578 | Ronning et al. | May 10, 1949 |
| 2,548,559 | Ronning et al. | Apr. 10, 1951 |
| 2,566,054 | Burkett | Aug. 28, 1951 |
| 2,733,652 | Dwyer | Feb. 7, 1956 |
| 2,897,747 | May | Aug. 4, 1959 |

FOREIGN PATENTS

| | | |
|---|---|---|
| 158,733 | Australia | Sept. 9, 1954 |